United States Patent Office 2,704,749
Patented Mar. 22, 1955

2,704,749

STABILIZATION OF POLYSTYRENE

Ernest H. Wood, Westfield, N. J., and James R. Wilkinson, Milwaukee, Wis., assignors to Union Carbide and Carbon Corporation, a corporation of New York No Drawing. Application July 1, 1952,
Serial No. 296,706

3 Claims. (Cl. 260—45.85)

This invention relates to polystyrene and more particularly to the stabilization of polystyrene against deterioration upon weathering and exposure to ultraviolet light.

Polystyrene has become widely known, as it possesses many unique and desirable properties which lend themselves to many purposes. Although its applications are numerous and its use extensive, there are instances in which the performance of polystyrene is not entirely satisfactory. For example, upon weathering and exposure to ultraviolet light, polystyrene deteriorates and commences to turn yellow, becomes dull, and eventually fine cracks and crevices develop. Furthermore, polystyrene upon weathering is subject to degradation by loss of molecular weight. While various expedients have been proposed to overcome this defect, no completely satisfactory means of providing adequate stabilization against such deterioration has been available.

In general, our invention comprises the incorporation of small but effective amounts of a stabilizing agent with plasticized or unplasticized polystyrene compositions so as to render them resistant to the effects of weather and light. While varying percentages of the stabilizers may be employed, we have found that from about 0.1% to about 5% of the compounds by weight of polystyrene are particularly efficacious. The stabilizing agent must be intimately admixed with polystyrene, and it has been found that the quantities of the stabilizing agent employed do not materially alter the other properties of the product or detract from the value thereof in their customary uses.

Substances which we have found effective as light stabilizers are the diaryl esters of resorcinol; particularly beneficial are resorcinol dibenzoate and resorcinol disalicylate. The stabilizers of our invention may be incorporated in polystyrene by any of the well known methods in the art. For example, this may be accomplished by film casting, wherein the stabilizer and polystyrene are dissolved in a mutual solvent and the solvent evaporated, or if desired the stabilizer may be incorporated in polystyrene on a conventional two-roll mill or in a Banbury mixer. In addition, the stabilizer may be added to polystyrene during the course of manufacture in the same manner that coloring materials are normally added.

The stabilizing effects of resorcinol dibenzoate and resorcinol disalicylate on polystyrene were measured by two methods. The first consisted of placing samples of stabilized and unstabilized polystyrene out of doors on a rack at a 45° angle facing south. It has been found that when these materials are so exposed the effects of weathering and light are related to the number of sun hours of exposure. The number of sun hours in a day is determined by the total time during a day that the sun's radiation of energy is at or above the rate of 180 B. t. u.'s per square foot per hour. As is evident, outdoor exposure of samples is of necessity time-consuming, and consequently accelerated weathering tests were also performed. The accelerated weathering tests consisted of exposing samples of polystyrene in the Atlas X1A accelerated Weather-O-Meter. A comparison of the samples after exposure to either the sun or the Weather-O-Meter furnishes a means of determining the stabilizing effect of our stabilizers.

The following examples more fully disclose the invention.

Example 1

Resorcinol dibenzoate and resorcinol disalicylate were added to polystyrene in separate operations by filmcasting at concentrations of 0.1%, 0.5%, and 1% by weight of polystyrene. After 500 hours of accelerated weathering, the polystyrene containing 1% of resorcinol dibenzoate was the least discolored, being comparable in color to unstabilized polystyrene exposed for 350 hours. The polystyrene stabilized with 0.1% and 0.5% of resorcinol dibenzoate and with 0.1%, 0.5% and 1% of resorcinol disalicylate discolored less than the unstabilized polystyrene.

Example 2

Resorcinol dibenzoate was added to polystyrene by roll milling at concentrations of 2%, 3%, 4%, and 5% by weight. During accelerated and outdoor weathering polystyrene containing 2% of resorcinol dibenzoate discolored the least rapidly, and all of the stabilized polystyrenes discolored less rapidly than unstabilized polystyrene. After 500 hours of accelerated weathering the polystyrene stabilized with 2% resorcinol dibenzoate was comparable in color to unstabilized polystyrene exposed 300 to 350 hours.

Example 3

To polystyrene containing 2% resorcinol debenzoate was added 1.3% of a white pigment. This preparation and an unstabilized polystyrene preparation also containing 1.3% of the identical pigment were subjected to accelerated weathering. The stabilized white polystyrene discolored less than the unstabilized white polystyrene.

Example 4

The method of incorporating our stabilizers into polystyrene does not materially affect the beneficial results obtained. For example, resorcinol dibenzoate was added to polystyrene by four different methods, and the products obtained therefrom were subjected to weathering, and the results compared with unstabilized polystyrene. The comparison was as follows:

(A) When resorcinol dibenzoate was added by roll milling at 2% concentration, it was found that after 500 hours of accelerated weathering the stabilized polystyrene was comparable in color to unstabilized polystyrene weathered from 250 to 300 hours. After 600 hours of sun exposure the stabilized polystyrene was comparable in color to unstabilized polystyrene exposed for 450 sun hours.

(B) When resorcinol dibenzoate was added to polystyrene by filmcasting at 2% concentration, it was found that after 500 hours of accelerated weathering the stabilized polystyrene was comparable in color to unstabilized polystyrene exposed 350 hours.

(C) When resorcinol dibenzoate at 2% concentration was added to polystyrene by the Banbury-roll-mill method, it was found that after 400 hours of accelerated weathering the stabilized polystyrene was comparable in color to unstabilized polystyrene exposed 250 hours. After 600 sun hours of outdoor exposure the stabilized polystyrene was comparable in color to unstabilized polystyrene exposed 400 sun hours.

(D) When resorcinol dibenzoate was added to polystyrene in 2% concentration by incorporating the stabilizer during its production, it was found that after 400 hours of accelerated weathering the stabilized polystyrene was comparable in color to unstabilized polystyrene exposed 200 to 250 hours. After 300 sun hours of outdoor exposure the stabilized polystyrene was comparable in color to unstabilized polystyrene exposed 200 sun hours.

In addition to the reduction of discoloration during weathering and exposure to ultraviolet light, the incorporation of resorcinol dibenzoate and resorcinol disalicylate into polystyrene results in less molecular degradation upon weathering. The example below indicates the effect of adding our stabilizers to polystyrene in terms of loss in relative molecular weight. The polystyrene before degradation had an apparent molecular weight of about 60,000 to 70,000.

Example 5

| Stabilizer | Weight Percent of Stabilizer | Loss in Relative Molecular Weight | |
|---|---|---|---|
| | | Stabilized Polystyrene | Unstabilized Polystyrene |
| Resorcinol Dibenzoate | 0.1 | 7,800 | 25,600 |
| | 0.5 | 13,300 | 25,600 |
| | 1.0 | 17,300 | 25,600 |
| | 2.0 | 10,100 | 22,200 |
| Resorcinol Disalicylate | 0.1 | 19,500 | 25,600 |
| | 0.5 | 10,400 | 25,600 |
| | 1.0 | 7,900 | 25,600 |
| | 2.0 | 7,500 | 22,200 |

The hereinbefore-described specific examples are solely illustrative of the unforeseen and valuable benefits of the present invention. It is evident that our stabilizers may be advantageously employed with polystyrene or modified polystyrene compositions, particularly such compositions as may contain plasticizers, pigments, dyes, fillers, and other well known modifiers. Therefore, no limitations are intended except as appear in the appended claims.

We claim:
1. A composition of matter comprising polystyrene and from 0.1% to 5% by weight of polystyrene of a compound taken from the group consisting of resorcinol dibenzoate and resorcinol disalicylate, said composition being characterized by stability against deterioration upon weathering and exposure to ultraviolet light.
2. A composition of matter comprising polystyrene and from 0.1% to 5% of resorcinol dibenzoate by weight of polystyrene, said composition being characterized by stability against deterioration upon weathering and exposure to ultraviolet light.
3. A composition of matter comprising polystyrene and from 0.1% to 5% of resorcinol disalicylate by weight of polystyrene, said composition being characterized by stability against deterioration upon weathering and exposure to ultraviolet light.

References Cited in the file of this patent

UNITED STATES PATENTS

| | | |
|---|---|---|
| 2,554,060 | Samaras | May 22, 1951 |
| 2,592,310 | Meyer et al. | Apr. 8, 1952 |